United States Patent
Hanak

[15] 3,634,933
[45] Jan. 18, 1972

[54] MAGNETIC HEAD METHOD

[72] Inventor: Joseph John Hanak, Trenton, N.J.
[73] Assignee: RCA Corporation

[22] Filed: Dec. 23, 1969
[21] Appl. No.: 889,771

Related U.S. Application Data

[62] Division of Ser. No. 725,811, May 1, 1968, Pat. No. 3,544,982.

[52] U.S. Cl. ....................29/603, 179/100.2 C
[51] Int. Cl. ....................H01f 7/06
[58] Field of Search ....................29/603; 340/174.1 F; 179/100.2 C; 346/74 MC

[56] References Cited

UNITED STATES PATENTS

| | | | |
|---|---|---|---|
| 3,353,261 | 11/1967 | Bradford et al. | 29/603 |
| 2,706,752 | 4/1955 | Dupy | 179/100.2 C |
| 2,785,038 | 3/1957 | Ferber | 179/100.2 C X |
| 3,224,074 | 12/1965 | Peters | 29/603 |
| 3,458,926 | 8/1969 | Maissel et al. | 29/603 |
| 3,479,738 | 11/1969 | Hanak | 29/603 |
| 3,543,396 | 12/1970 | Illg et al. | 29/603 |

*Primary Examiner*—John F. Campbell
*Assistant Examiner*—Carl E. Hall
*Attorney*—Edward J. Norton

[57] ABSTRACT

An integral multihead magnetic transducer and method of manufacturing the same which is for example suitable for use in contact or noncontact disc recording. The transducer is comprised of blocks of preferred magnetic material having desired grooved shape and surface smoothness which are united and gap-filled by stipulated nonmagnetic materials to form a loaf. In one embodiment a nonmagnetic base is affixed to the loaf from which selected portions are removed to form an integral head assembly having a series of recording heads at spaced intervals. For certain applications the nonmagnetic base may be dispensed with, in which case selected pieces of the loaf are removed at spaced intervals with the remaining portions providing the backing and structural support for the resultant series of magnetic heads. In either case a multiple transducer is provided with accurately located heads and perfectly aligned recording gaps.

6 Claims, 6 Drawing Figures

PATENTED JAN 18 1972

3,634,933

INVENTOR
JOSEPH JOHN HANAK

BY Edward J Norton
ATTORNEY

MAGNETIC HEAD METHOD

This is a division of application Ser. No. 725,811 filed May 1, 1968, now U.S. Pat. No. 3,544,982.

BACKGROUND

There has long existed in the magnetic recording art a need for a recording transducer which is durable, small enough to facilitate use in closely spaced multiple head assemblies and yet minimize "crosstalk." Such requirements are dictated by magnetic disk recording apparatus and more particularly random-access computer disk recording equipment. The difficulty of fulfilling these requirements in the disk recording art in the past has necessitated the use of a single "flying" head for scanning a large number of tracks which may be as many as 200. However with such an approach, the average access time required to address a given location on the disk is over 60 milliseconds.

By providing one head for each track through the use of a multiple head assembly, addressing can be done electronically which would result in a decrease of access time by a factor of 20. By fabricating these heads from magnetically efficient and wear-resistant material, the heads may be used in either noncontact or in-contact applications which provides higher bit density recording.

Although the present invention is particularly applicable to disk recorders, it is to be understood that the principles of the present invention may be utilized in the magnetic recording art generally.

It is therefore an object of the present invention to provide an improved multitrack magnetic head and method of making the same.

It is another object to provide a magnetic transducer which is small, durable, and may be fabricated as a closely spaced multiple head assembly.

It is a further object to provide a multitrack magnetic head assembly having substantially perfect gap alignment.

It is still another object to provide a method of forming a plurality of magnetic transducers as a single entity.

Briefly, in accordance with the present invention, two blocks of a magnetic material having desired magnetic and structural properties are provided with the proper grooved shape and surface smoothness. The blocks are positioned so that their grooved surfaces are in confronting relation. The blocks are united by a preferred bonding material to form a loaf having a gap between the confronting surface, the gap extending between the aperture formed by the grooves and the upper surface of the loaf. A nonmagnetic material is disposed in the gap. A base element of nonmagnetic material is affixed to the bottom surface of the loaf by a specified bonding material to form an integral unit. The magnetic material of the loaf is removed at spaced intervals along the integral unit to form a series of projecting magnetic core members which constitute a multiple head assembly with perfectly aligned recording gaps. According to another aspect of the present invention, initially the loaf is structured in the manner indicated above. A series of spaced channels are then provided in the loaf which are normal to the gapped surface and which extend partially through the loaf. The projecting cores of magnetic material thus formed constitute a multiple head assembly with perfectly aligned recording gaps.

Figure 1:
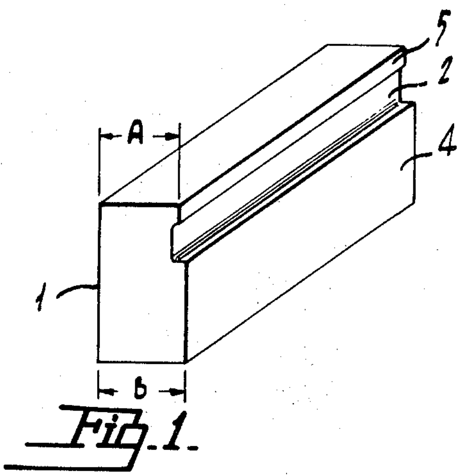
FIG. 1 is a perspective view of a magnetic circuit part of the present invention.
Figure 2:
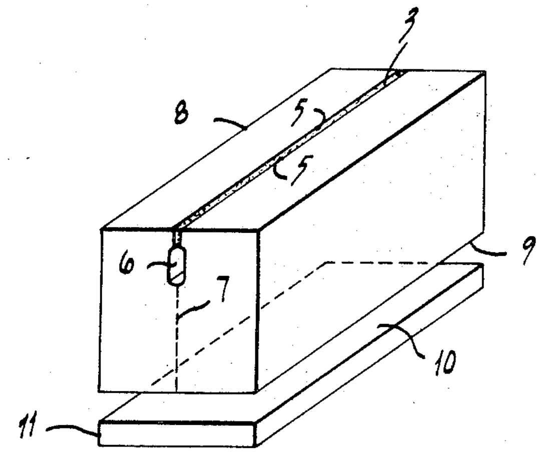
FIG. 2 is a perspective view of a combination of elements which form a part of a magnetic head assembly according to the present invention.
Figure 3:
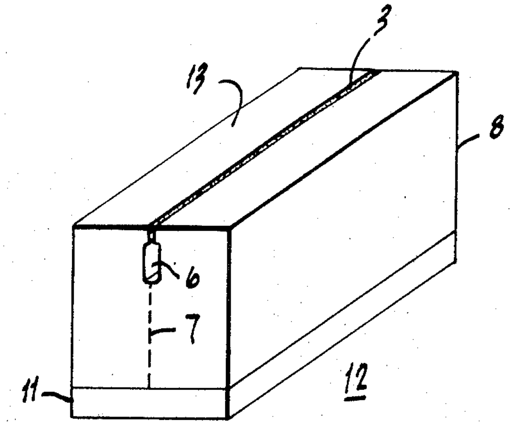
FIG. 3 is a perspective view of a partially completed magnetic head assembly of the present invention.
Figure 4:
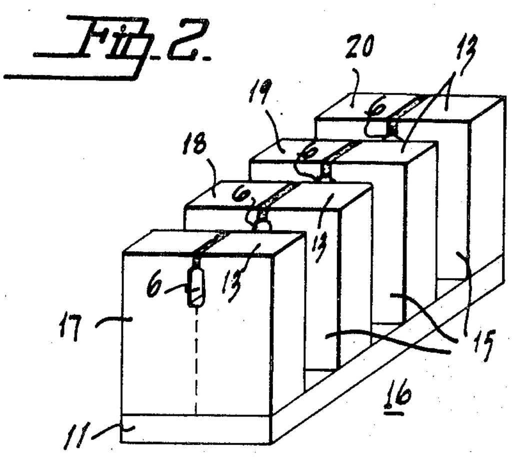
FIG. 4 is a perspective view of one embodiment of a multitrack magnetic head assembly according to the present invention.

If reference is made to FIG. 1, there is shown a block 1 of magnetic material preferably constructed of ferrite or a high-permeability alloy of iron, silicon and aluminum such as alfecon or one of the high-permeability metallic alloys such as mumetal. The block 1 is preferably rectangular in shape with a groove 2 coextensive with the longer dimension of the block 1. The width or thickness of the portion of the block 1 denoted "A," is made to be smaller than the thickness of that portion of the block 1 denoted "B," by approximately an amount equal to one-half of the desired gap dimension for the heads to be constructed. A pair of identical blocks 1, are then placed in juxtaposed position wherein the surfaces 4 are in confronting relation and the surfaces 5 define a gap between the blocks 1. FIG. 2 shows a resultant assembly in which the blocks 1 have been united along line 7 to form a loaf 8, having a longitudinal aperture 6 and a nonmagnetic filled gap 3 disposed between the surfaces 5. There is also shown in FIG. 2 a base member 11 whose cross section dimensions may be approximately the same as the loaf 8. The base 11 is constructed of a nonmagnetic material and preferably has a coefficient of expansion which is essentially equal to the coefficient of expansion of the material of the loaf 8. The bottom surface 9 of the loaf 8 and the top surface 10 of the base 11 are polished flat to an optical finish. As shown in FIG. 3 the loaf 8 is placed on top of the base 11 and the surfaces 9 and 10 are bonded together to form the magnetic circuit member 12. Details of the materials and method to be used for uniting the block 1, filling the gap and bonding on the base 1, for particular applications are hereinafter disclosed. As shown in FIG. 4 a series of essentially parallel channels 15 are provided at spaced intervals which extend from the top surface 13 down to the base element 11. The result is an integral multihead assembly 16 having projecting cores 17, 18, 19 and 20 which constitute a plurality of recording heads with perfectly aligned gap-separated pole pieces. The width of the channels 15 and therefore the thickness of each head may be selected for a given application. For example, in computer disk stations both dimensions may be 0.005 inch.

Figure 5:
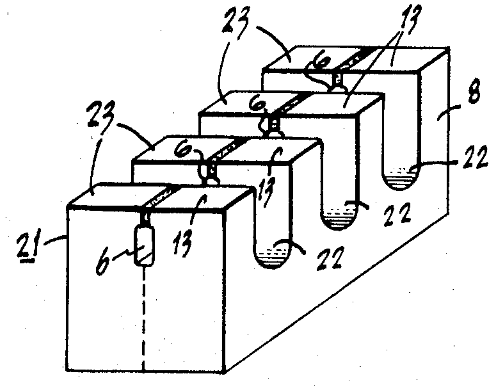
FIG. 5 is a perspective view of another embodiment of a multiple head assembly according to this invention.

In the multiple head assembly thus far disclosed, one function of the nonmagnetic base member is to prevent signals from one head from being transmitted to an adjacent head which is commonly known as crosstalk. However, for recording applications where some crosstalk does not pose a problem or where crosstalk is minimized, such as in high-frequency recording of say several megaHertz, the nonmagnetic base may be eliminated. This is possible since the magnetic flux, especially at high frequency, will follow the shortest magnetic path. Therefore, alternatively a multiple head assembly 21 may be provided as shown in FIG. 5 wherein the base is eliminated. The basic magnetic circuit member of this embodiment which is the loaf 8 is constructed in the same manner disclosed above. However, in the present embodiment of FIG. 5 the heads 23 are formed by providing essentially parallel channels 22 which extend from the top surface 13 of loaf 8 only partially through the loaf 8. The portions of the loaf 8 below the channels 22 therefore serve as backing support for the structure. The result is an integral multihead assembly 21, having projecting cores 23 which constitute a plurality of recording heads with perfectly aligned gap separated pole pieces. This type of structure is superior from the standpoint of strength and mechanical stability and is also cheaper and simpler to fabricate.

More particular reference will now be made to the materials and methods of fabricating the multiple track heads of the accompanying drawings.

Figure 6:
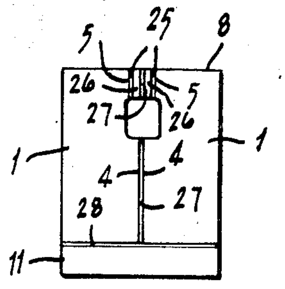
FIG. 6 is an enlarged end view of the assembly of FIG. 3.

If reference is made to FIG. 6 there is shown an enlarged end view disclosing construction details of the assembly 12 of FIG. 3. FIG. 6 shows a loaf 8 of magnetic material comprised of identical blocks 1. Each of the blocks 1 has a nonmagnetic gap filler material 26 affixed to the surface 6 by means of the bonding agent 25. The gap filler 26 and surfaces 4 of the blocks 1 are joined by the bonding agent 27. The nonmagnetic base member 11 is secured to the loaf 8 by means of bonding agent 28. As previously indicated the blocks comprising the loaf 8 are composed of a magnetic material having low reluctance for example single crystal ferrite such as manganese zinc ferrite or nickel zinc ferrite; or a polycrystalline ferrite having similar constituents; or a high-permeability alloy such as alfecon or mumetal. Where the blocks 1 are composed of one of the indicated ferrites, the loaf 8 is preferably structured in the following described manner. A pair of blocks 1 are provided each of which has a thin film of glass 25 on its surface 5 which in turn is covered by a layer 26 of alumina ($Al_2O_3$) or alternatively both the film 25 and the layer 26 are glass. The blocks 1 are positioned with the surfaces 4 confronting each other and with a layer of glass 27 disposed between the layers 26. The loaf 8 is then formed by fusing the blocks 1 together in a vacuum at a temperature of at least 10° C. higher than the softening point of the glass 27 and a pressure of at least 2,000 pounds per square inch, which results in the glass layer 27 acting as a flux which diffuses into the ferrite and causes a molecular transport of the ferrite molecules from one ferrite block to the other. The result upon cooling is a bond of the ferrite surfaces 4 which has a reluctance which is of the same order of magnitude as the reluctance of the ferrite of the blocks 1. Since a similar molecular transport does not take place between the layer 27 and layer 26 a gap of relatively high reluctance is provided between the surfaces 5 of the blocks 1. The base 11 which is preferably composed of one of the nonmagnetic ceramics such as alumina, glass or steatite is affixed to the bottom surface 9 of the ferrite loaf 8 by the bonding agent 28. The bonding agent 28 may be an organic glue or glass. Where the bond 28 is glass the bonding method is preferably as follows. The bottom surface 9 of the ferrite loaf 8 and the top surface 10 of the nonmagnetic base 11 which are to be mated are polished flat to an optical finish. Next a layer of glass at least 500 angstrom units thick is deposited on each of the mating surfaces 9 and 10 preferably by means of radiofrequency sputtering or chemical vapor deposition. Alternately, a thin wafer of glass can be placed between the mating surfaces 9 and 10 instead of depositing a layer of glass on the mating surfaces. Then the loaf 8 and base 11 which are to be mated are placed in a vacuum of from $10^{-2}$ to $10^{-3}$ Torr. with the mating surfaces 9 and 10 facing each other, under an applied pressure of from 2,000 to 6,000 lb./in.$^2$ normal to the mating surfaces and at a temperature of at least 10° C. greater than the softening point of the bonding glass 28 used. These conditions are maintained for a period of at least 10 minutes. As a result the ferrite loaf 8 is affixed to the nonmagnetic base 11 by means of the glass bond 28 to form the integral unit 12 as shown in FIG. 3. A variety of glasses can be used for the bonding agent 28, however it should preferably having a softening point not exceeding that of the glass bonding agents 25 and 27 used in constructing the loaf 8 and also preferably not exceeding the softening point of the base 11 when it is composed of glass. Although high softening point glasses such as Pyrex have been successfully employed for the bonding agent 28, it is preferable to use lower softening point glasses such as lead glass.

Alternatively, the loaf 8 and base assembly 12 is structured in the same manner just described, however, the nonmagnetic base 11 is instead comprised of a nonmagnetic metal which is light, strong and noncorrosive such as aluminum, titanium, magnesium, stainless steel, brass, beryllium or beryllium-copper. Where the base 11 is one of the indicated nonmagnetic metals, an organic glue such as epoxy cement is used as the bonding agent 28 to unite the loaf 8 and base 11. This bond is not as strong as the glass bond, but it is sufficient in most applications. Where an organic glue bond 28 is used, it is preferable to roughen the flat mating surfaces 9 and 11 for example by sandblasting before the bonding operation. Further variations are possible for the assembly 12 wherein the blocks 1 are again composed of ferrite with the gap filler 26 being beryllium-copper, hard electroplated chromium, silicon monoxide (SiO) or mica, which is bonded to the surface 5 of blocks 1 by the bonding agent 25 which is an organic glue such as epoxy cement. An organic glue such as epoxy is also used for the bond 27 which unites the blocks 1 to form the loaf 8. Where the bonding agents 25 and 27 are epoxy the gap filler 26 may also be epoxy. In those embodiments where the bonding agents 25 and 27 are an organic glue, the base material 11 may be one of the nonmagnetic ceramics such as glass, alumina, steatite, or a light, strong noncorrosive, nonmagnetic metal such as aluminum, titanium, magnesium, stainless steel, brass, beryllium or beryllium-copper. Where the base 11 is a nonmagnetic metal, the bonding agent 28 should preferably be an organic glue so as not to destroy the bonds 25 and 27 by exposing them to the high temperatures required if a glass bonding agent 28 were used. As a further alternative for the assembly 12, the blocks 1 may be comprised of a high-permeability alloy such as alfecon or mumetal with the gap filler 26 being beryllium-copper, hard electroplated chromium, SiO or mica and the bonding agents 25 and 27 are an organic glue such as epoxy cement. The base 11 again is preferably one of the nonmagnetic ceramics such as glass, alumina, steatite, or a light, strong, noncorrosive, nonmagnetic metal such as aluminum, titanium, magnesium, stainless steel, brass, beryllium, or beryllium-copper which is joined to the loaf 8 by the bonding agent 28 which is an organic glue.

For all the embodiments thus far described in reference to FIG. 6 the final multiple transducer assembly 16 as shown in FIG. 4 is produced by providing a series of magnetic heads 17 through 20 which project from the base 11. The projecting heads 17 through 20 are provided by machining out sections of the loaf 8 down to the base 11 at spaced intervals for example by means of a diamond cutting wheel. Alternatively, the desired sections can be removed by high-energy laser machining which vaporizes the material where cuts are desired. Electrical machining methods such as spark cutting or electron-beam machining may also be used to cut out the desired sections in forming either the final multiple head assembly 16 of FIG. 4 or assembly 21 of FIG. 5. However, where electrical machining methods are used, the magnetic material of the blocks 1 is preferably an electrically conductive high-permeability alloy such as alfecon or mumetal or single-crystal or polycrystalline conductive ferrite. It is not necessary that elements 25, 26 and 27 also be electrically conductive. Where the blocks 1 are conductive ferrite, the gap filler 26 is alumina or glass with the bonding agents 25 and 27 being glass. An organic glue such as epoxy may also be used here for the gap filler 26 and bonding agents 25 and 27. In the embodiment of FIG. 4, where the base 11 is employed in conjunction with an electrically conductive magnetic material for the loaf 8, the base 11 should be preferably a light, strong and noncorrosive nonmagnetic metal such as aluminum, titanium, magnesium, stainless steel, brass, beryllium or beryllium-copper which is secured to the loaf 8 by means of an organic glue bonding agent 28 such as conductive epoxy. Where the blocks 1 are either alfecon or mumetal and electrical machining methods are to be used to form the final assembly, the gap filler 26 is either beryllium-copper, SiO or mica with the bonding agents 25 and 27 being an organic glue. Here again if a base 11 is used, as in the assembly 12 of FIG. 4, it should be a light, strong, noncorrosive nonmagnetic metal such as aluminum, titanium, magnesium, stainless steel, brass, beryllium or beryllium-copper which is secured to the loaf 8 by means of the bonding agent 28 such as conductive epoxy.

Following the fabrication of the assemblies 16 or 21 signal transfer means in the form of one or more turns of wire are looped through the aperture 6 and about the core of each of the heads of the assembly. For additional structural support the open spaces between the heads below the recording surface plane 13 may be filled with an organic potting compound.

It has been found that the structure of the present invention in conjunction with the materials disclosed is suitable for both contact and noncontact recording applications except in those embodiments where the gap filler 26 is mica or epoxy which are more suitable for noncontact recording.

What is claimed is:

1. A method for manufacturing a multiple magnetic head transducer assembly of the type consisting of a member formed of magnetic material, with said member having in a surface thereof a gap extending partially through said member and a nonmagnetic base member comprising the steps of:

a. polishing to an optical finish both the surface of said member which is opposite to said surface containing said gap and a surface of said base member;

b. then positioning said polished surfaces in facing relation with a bonding agent interposed therebetween;

c. then placing said last-mentioned combination in a vacuum at a raised temperature;

d. then exerting pressure on said load and said base in said vacuum, said pressure urging the polished surfaces together to form a bond therebetween; and e. then removing at spaced intervals along said base selected portions of said member, said removed portions including corresponding portions of said gapped surface, to form a multiple head assembly.

2. The method according to claim 1 wherein:

a. said bonding agent is interposed by chemical vapor deposition of glass to a thickness of at least 500 angstrom units on each of said polished surfaces;

b. said loaf and said base are placed in a vacuum of at least $10^{-2}$ Torr. at a temperature of at least 10° C. higher than the softening point of the glass bonding agent; and c. the pressure exerted is at least 2,000 pounds per square inch for a period of at least 10 minutes.

3. A method according to claim 1 wherein:

a. said bonding agent is interposed by radiofrequency sputtering of glass to a thickness of at least 500 angstrom units on each of said polished surfaces;

b. said loaf and said base are placed in a vacuum of at least $10^{-2}$ Torr. at a temperature of at least 10° C. higher than the softening point of the glass bonding agent; and c. the pressure exerted is at least 2,000 pounds per square inch for a period of at least 10 minutes.

4. In a method for manufacturing multiple head magnetic transducer assemblies including uniting at least two blocks of ferrite material by molecular transport, said blocks having a gap extending partially therebetween which is filled with a nonmagnetic gap-spacing material, the improvement comprising the steps of:

a. polishing to an optical finish both the surface of the united blocks which is opposite the surface containing the gap and a surface of a base member;

b. then depositing a layer of glass on each of said polished surfaces;

c. then placing said united blocks and base member in a vacuum at a raised temperature with said glass-covered surfaces facing each other;

d. then exerting a pressure on said blocks and said base uniting said glass-covered surfaces to form an integral bonded assembly; and e. then removing at spaced intervals along said base selected portions of said ferrite block material, said removed portions including corresponding portions of said gap, to form a multiple head assembly.

5. A method for manufacturing multiple head magnetic transducer assemblies, according to claim 1, wherein said magnetic member having a gap in one surface thereof is formed of electrically conductive magnetic material;

said selected portions of said magnetic member are removed by electrical machining to form a plurality of magnetic cores.

6. A method for manufacturing multiple head magnetic transducer assemblies according to claim 1, wherein said selected portions of said magnetic member are removed by laser machining to form a plurality of magnetic cores.

* * * * *